(12) United States Patent
Sherve et al.

(10) Patent No.: US 11,037,586 B1
(45) Date of Patent: Jun. 15, 2021

(54) METHODS AND SYSTEMS FOR PROVIDING ELECTRICAL POWER TO ONE OR MORE HEAT SOURCES IN ONE OR MORE SLIDERS WHILE LAPPING SAID SLIDERS

(71) Applicant: Seagate Technology LLC, Cupertino, CA (US)

(72) Inventors: Andrew Sherve, Minneapolis, MN (US); Jeff O'Konski, Savage, MN (US); Yuhong Xiong, Maple Grove, MN (US); Andrew Habermas, Bloomington, MN (US)

(73) Assignee: Seagate Technology LLC, Fremont, CA (US)

( * ) Notice: Subject to any disclaimer, the term of this patent is extended or adjusted under 35 U.S.C. 154(b) by 217 days.

(21) Appl. No.: 16/380,056

(22) Filed: Apr. 10, 2019

(51) Int. Cl.
*G11B 5/31* (2006.01)
*B24B 37/04* (2012.01)

(52) U.S. Cl.
CPC .......... *G11B 5/3169* (2013.01); *B24B 37/046* (2013.01); *G11B 5/3173* (2013.01)

(58) Field of Classification Search
None
See application file for complete search history.

(56) References Cited

U.S. PATENT DOCUMENTS

| | | | |
|---|---|---|---|
| 6,857,937 B2 | 2/2005 | Bajorek | |
| 7,119,990 B2 | 10/2006 | Bajorek et al. | |
| 7,551,406 B1 | 6/2009 | Thomas et al. | |
| 7,911,736 B2 | 3/2011 | Bajorek | |
| 8,165,709 B1 | 4/2012 | Rudy | |
| 8,456,969 B1 | 6/2013 | Mooney et al. | |
| 8,861,316 B2 | 10/2014 | Yin et al. | |
| 9,721,595 B1 | 8/2017 | Rudy et al. | |
| 2004/0235394 A1* | 11/2004 | Ota | B24B 37/048 451/7 |
| 2011/0113620 A1* | 5/2011 | Sasaki | G11B 5/3163 29/603.07 |
| 2019/0381628 A1* | 12/2019 | Habermas | G11B 5/3163 |
| 2019/0381629 A1* | 12/2019 | Rejda | B24B 37/048 |

OTHER PUBLICATIONS

Unpublished Utility U.S. Appl. No. 15/807,249, filed Nov. 8, 2017 (no attachment).
Unpublished Utility U.S. Appl. No. 16/383,083, filed Apr. 12, 2019 (no attachment).

* cited by examiner

*Primary Examiner* — William J Klimowicz
(74) *Attorney, Agent, or Firm* — Kagan Binder, PLLC

(57) ABSTRACT

The present disclosure includes methods and systems for lapping a row bar of sliders. According to the present disclosure, an electrical interconnect configuration is provided that permits the net current provided to a row bar to heat electrical heating devices during lapping to be managed so as help prevent exceeding breakdown currents of related electrical channels.

20 Claims, 5 Drawing Sheets

METHODS AND SYSTEMS FOR PROVIDING ELECTRICAL POWER TO ONE OR MORE HEAT SOURCES IN ONE OR MORE SLIDERS WHILE LAPPING SAID SLIDERS

BACKGROUND

The present disclosure relates to systems and methods of lapping a slider and/or row bar of sliders that can ultimately be used in a hard disc drive for read/write operations.

SUMMARY

The present disclosure includes embodiments of a method of lapping a row bar having a plurality of sliders, wherein the method includes:
a) providing the row bar, wherein the row bar includes:
  i) at least a first slider including:
    A) a first contact pad;
    B) a transducer region, wherein the transducer region includes at least a first heater device;
    C) an electrically insulating portion that includes the transducer region; and
    D) an electrically conductive portion adjacent to the electrically insulating portion, wherein the first heater device is electrically connected to the first contact pad and the electrically conductive portion; and
  ii) at least a second slider including:
    A) a second contact pad;
    B) a transducer region, wherein the transducer region includes at least a second heater device;
    C) an electrically insulating portion that includes the transducer region; and
    D) an electrically conductive portion adjacent to the electrically insulating portion, wherein the second heater device is electrically connected to the second contact pad and the electrically conductive portion;
b) applying current from a power source to the row bar, wherein a positive-bias current is applied to the first heater device to generate heat and a negative-bias current is applied to the second heater device to generate heat;
c) lapping the row bar while applying the positive-bias current and the negative-bias current.

The present disclosure also includes embodiments a lapping system including:
a) a mounting structure that can removably couple a row bar, wherein the row bar includes:
  i) at least a first slider including:
    A) a first contact pad;
    B) a transducer region, wherein the transducer region includes at least a first heater device;
    C) an electrically insulating portion that includes the transducer region; and
    D) an electrically conductive portion adjacent to the electrically insulating portion, wherein the first heater device is electrically connected to the first contact pad and the electrically conductive portion; and
  ii) at least a second slider including:
    A) a second contact pad;
    B) a transducer region, wherein the transducer region includes at least a second heater device;
    C) an electrically insulating portion that includes the transducer region; and
    D) an electrically conductive portion adjacent to the electrically insulating portion, wherein the second heater device is electrically connected to the second contact pad and the electrically conductive portion;
b) a lapping plate having a lapping surface that is operable to rotate and contact the row bar to remove material from the row bar while the lapping plate rotates and contacts the row bar;
c) a power source electrically coupled the first and second contact pads; and
d) a controller electrically coupled to the power source, wherein the controller includes program instructions including:
  i) applying current from the power source to the first and second heater devices, wherein a positive-bias current is applied to the first heater device to generate heat and a negative-bias current is applied to the second heater device to generate heat; and
  ii) lapping the row bar while applying the positive-bias current and the negative-bias current.

DETAILED DESCRIPTION

Figure 1:
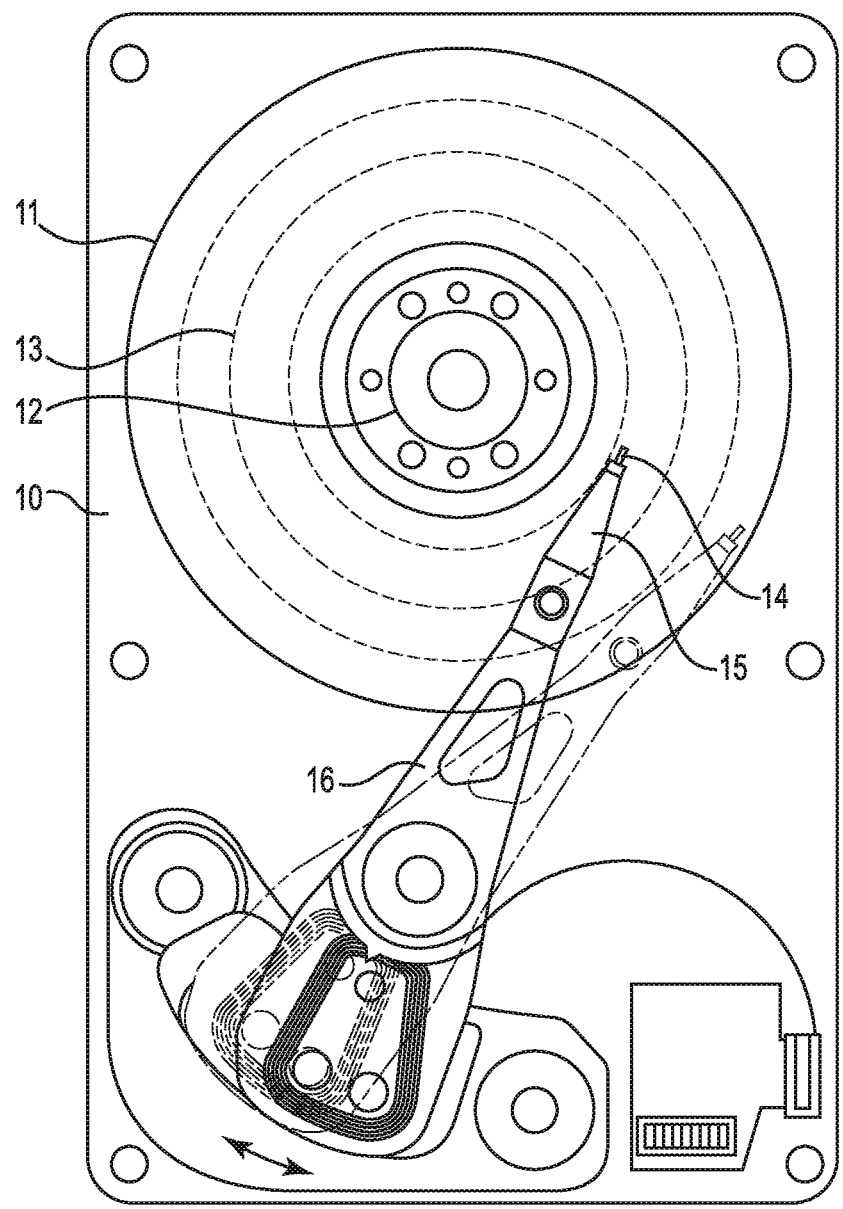
FIG. 1 shows a top view of a hard disc drive with the cover removed.

A magnetic recording apparatus is shown in FIG. 1. The apparatus 10 can be referred to as a hard disk drive (HDD) and includes a slider 14 that flies above a disk 11 by using air as a lubricant (an "air bearing"). Referring to FIG. 1, a disk 11 is placed on a spindle motor 12 that can rotate and a negative pressure air-lubricated bearing slider 14 is attached at a suspension 15 to correspond to the magnetic disk 11. The negative pressure air-lubricated bearing slider 14 can be moved (as indicated by the arrow and dashed lines) by an actuator 16 which pivots so that the slider 14 moves to a desired position on a track 13 of the disk 11. As shown, the disk 11 used as a recording medium has a circular shape and different information can be recorded on each track 13. In general, to obtain desired information, the slider 14 moves in search of a corresponding track on the disk 11.

Figure 2:
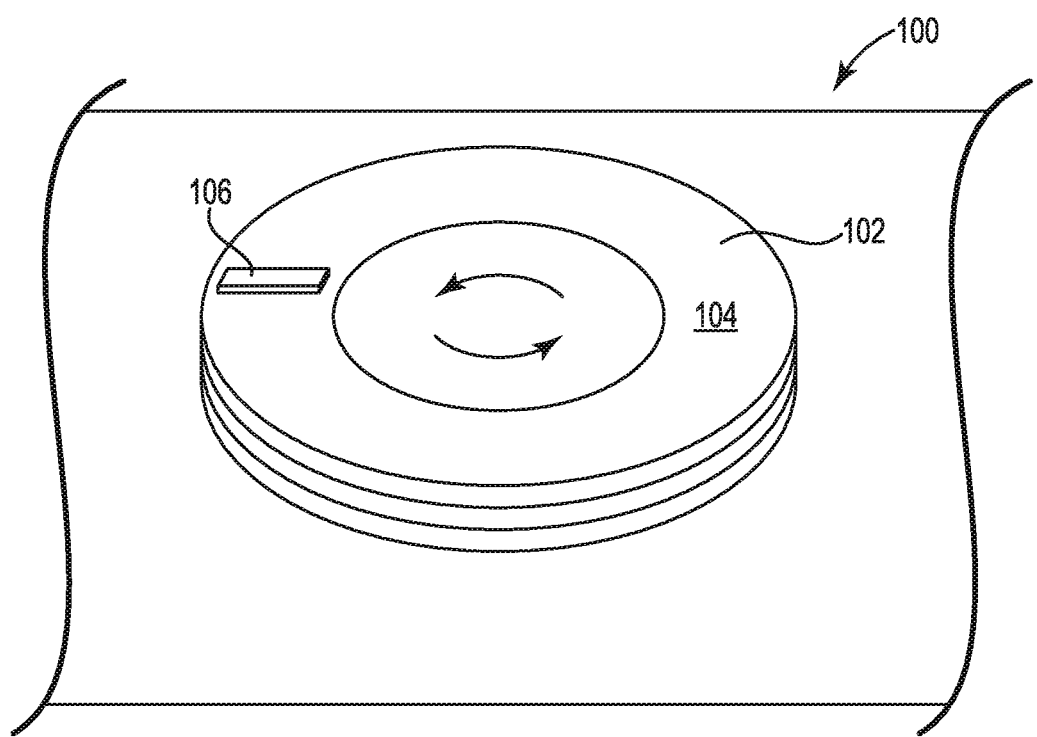
FIG. 2 is a schematic perspective view showing a row bar of sliders in relation to a lapping plate.

FIG. 2 diagrammatically depicts a lapping tool 100 used for machining a surface of a row bar that can be later sliced into a plurality of individual sliders such as slider 14. The tool 100 has a rotating lapping plate 102 defining a lapping surface 104 which can help abrase the surface of a ceramic material such as AlTiC. If desired, a slurry can be applied to the lapping surface 104 to enhance the abrasing action as the lapping surface 104 is rotated relative to a row bar 106 containing a plurality of the sliders held in a pressing engagement against the lapping surface 104. Lapping a row bar of sliders permits multiple slider bodies to be processed together, which can advantageously be relatively simple, precise and/or cost-effective. Lapping can involve multiple lapping steps such as rough lapping, final (kiss) lapping, and the like. At a desired point in manufacturing, individual sliders can be sliced from the row bar and ultimately used in a hard disk drive. In some embodiments, a row bar can include a plurality of sliders. In some embodiments, a row bar can include at least 30 sliders, at least 60 sliders, or even at least 70 sliders.

Rough Lapping can be considered a relatively coarse lapping procedure used to remove relatively more material as compared to kiss lapping. For example, rough lapping can remove up to 10 micrometers of material from a row bar in the lapping direction, or even up to 20 micrometers of material from a row bar in the lapping direction. A row bar can be tilted at a specific angle relative to the lapping plate to target a particular element (e.g., reader or writer).

Kiss Lapping can be considered a fine lapping procedure and can be used to remove fractions of material from a row bar as compared to rough lapping. For example, kiss lapping can remove 0.5 microns or less, or even 0.1 microns or less of material from a row bar in the lapping direction.

Figure 3:
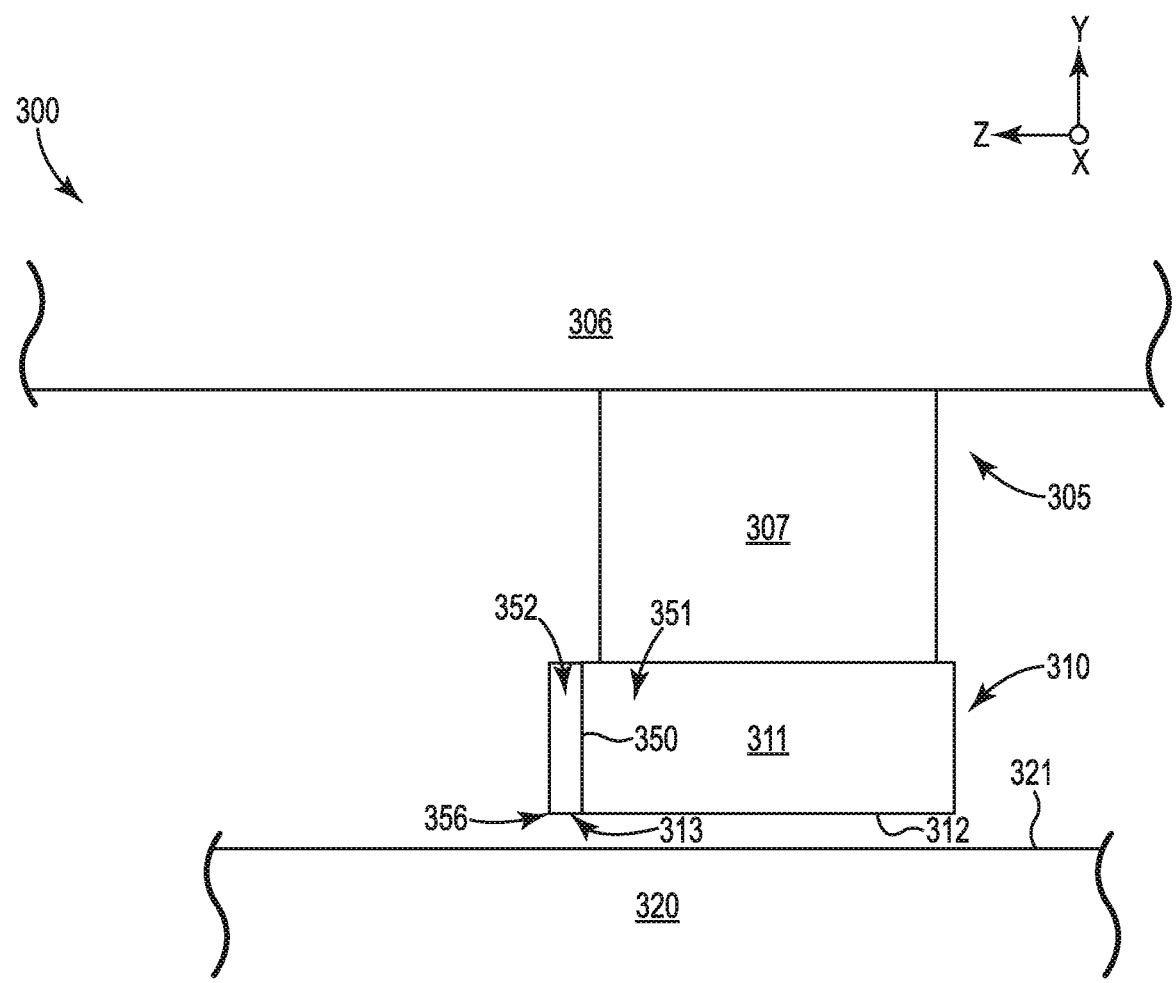
FIG. 3 is a schematic, partial, side view of a lapping system.

FIG. 3 illustrates an embodiment of a lapping system according to the present disclosure. As used herein, the direction along x-axis (into the page of FIG. 3) is referred to as the cross-track axis. The direction along the z-axis is referred to herein as the down-track axis, with reference to trailing edge 356. The direction along the y-axis is referred herein as the lapping direction (direction of material removal) or the reader stripe height direction and writer break-point direction.

As shown in FIG. 3, system 300 includes a mounting structure 305 that can removably couple a row bar 310. As shown in FIG. 3, mounting structure 305 includes an arm structure 306 and a carrier 307 removably attached to the arm structure 306. The row bar 310 can be removably attached to the carrier 307. A wide variety of techniques can be used to removably attach the row bar 310 to the carrier 307. In some embodiments, an adhesive (a rigid adhesive or a flexible adhesive) can be used to removably attach the row bar 310 to the carrier 307.

Row bar 310 includes a plurality of slider bodies 311, where each slider body 311 has an air bearing surface 312 having a transducer region 313. In some embodiments, a row bar can include at least 30 sliders, at least 60 sliders, or even at least 70 sliders. The transducer region 313 includes at least one writer (not shown) and at least one reader (not shown). An example of a transducer region is described in U.S. Pat. No. 8,456,969 (Mooney et al.) and U.S. Pat. No. 8,861,316 (Yin et al.), wherein the entirety of each patent is incorporated herein by reference. A writer and a reader can be made out of magnetic material such as a cobalt iron (CoFe) alloy.

A slider according to the present disclosure can be mostly made out of ceramic material. As shown in FIG. 3 slider 311 includes an "AlTiC break" 350. In some embodiments, the area 351 to the right of break 350, the bulk of the material is alumina titanium-carbide (also referred to as AlTiC). In some embodiments, the area 352 to the left of break 350, the bulk of the material, with the exception of many of the features in the transducer region 313, is alumina.

System 300 also includes a lapping plate 320 having a lapping surface 321 that is operable to rotate and contact the row bar 310 for lapping one or more transducer devices (e.g., writer and/or reader) of each slider 311.

After rough lapping, but before kiss lapping, one or more electronic features of corresponding transducer devices in the transducer region of a given slider may be a distance from their target values in the lapping direction. For example, before kiss lapping, an electromagnetic writer device (also referred to as a "writer") and a magnetoresistive reader device (also referred to as a "reader") may need to be lapped to their target values. Lapping to each target value of a writer and reader during kiss lapping can be difficult, especially when a writer and reader are at different distances from their respective target values.

A heat source can be used to expand a transducer device (e.g., a writer) in the transducer region of a given slider so that the expanded portion can be removed. For example, a writer device could be expanded a desired amount in the lapping direction so that the expanded portion could be removed via lapping.

Heat can be generated from a variety of electrical elements present in a transducer region of a slider. In some embodiments, the electrical element in the transducer region can be chosen from an electrical resistive heater, writer coils of an electromagnetic writer device, a laser/near field transducer (on-wafer laser), and combinations thereof. Lapping while heating one or more transducer devices is described in patent application Ser. No. 16/383,083 titled "METHODS OF LAPPING A SUBSTRATE WHILE HEATING AT LEAST A PORTION OF THE SUBSTRATE, AND RELATED SUBSTRATES AND SYSTEMS" by Sherve et al. filed on even date herewith, wherein the entirety of said patent application is incorporated herein by reference. Examples of electrical resistive heaters include one or more of an writer electrical resistive heater (used during lapping and disk operation), a reader electrical resistive heater (used during lapping and disk operations), and an optional electrical resisistive heating device used only during lapping.

Heat sources can be electrically coupled to one or more power sources to generate heat during lapping. The present disclosure includes methods and systems having an electrical interconnect configuration to provide electrical access among two or more transducer devices that can be energized during lapping. The electrical interconnect configurations disclosed herein can manage the net electrical current in a row bar during lapping while heating to avoid undue current that may damage one or more row bar devices (e.g., heaters, wire interconnects, etc.).

The present disclosure can be applied to a variety of slider heads such as perpendicular magnetoresistive (PMR) heads, head-assisted magnetoresistive (HAMR) heads, and the like. In some embodiments, the present disclosure can be useful with respect to PMR heads because areal density of PMR heads is affected by the accuracy of the write pole width, and write pole width accuracy is increasingly challenging as the write pole width is reduced and the flare angle is increased. In other embodiments, the present disclosure can be useful with respect to HAMR heads because the areal density and reliability can be affected by the break point control for the near-field transducer.

Figure 4:
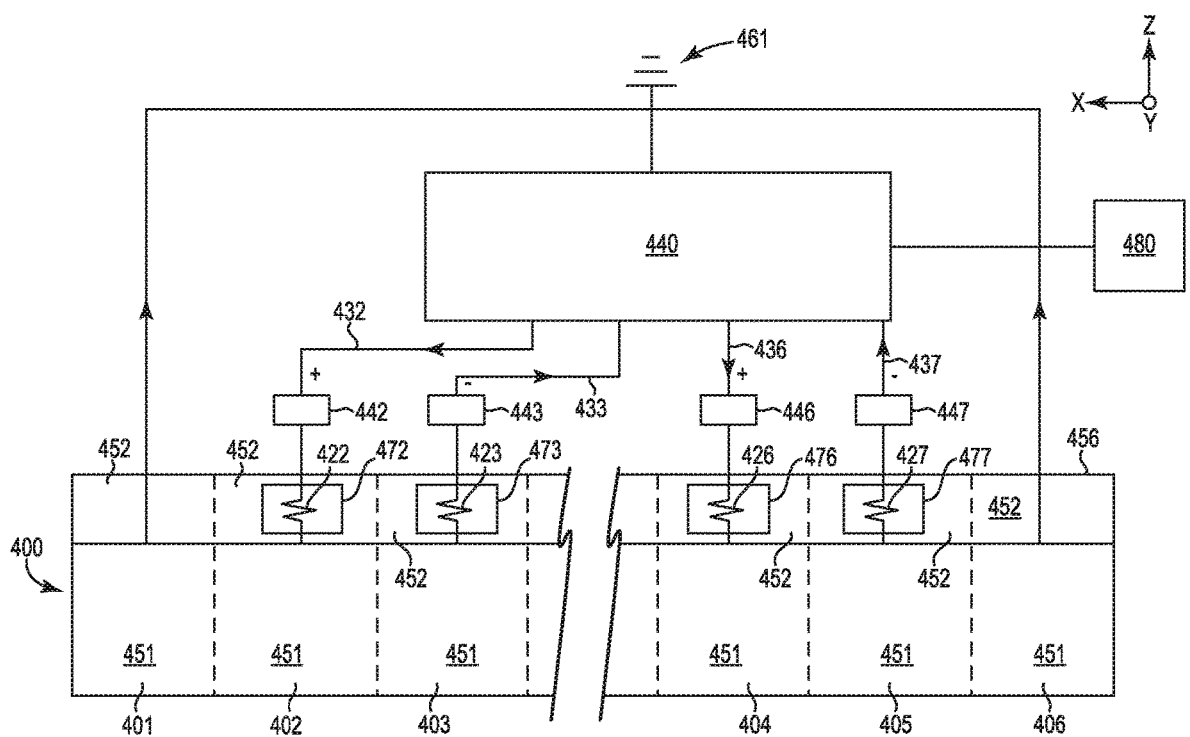
FIG. 4 is a schematic view of a portion of a row bar of sliders illustrating how electrical power is provided to heater devices in each slider according to the present disclosure.
Figure 5:
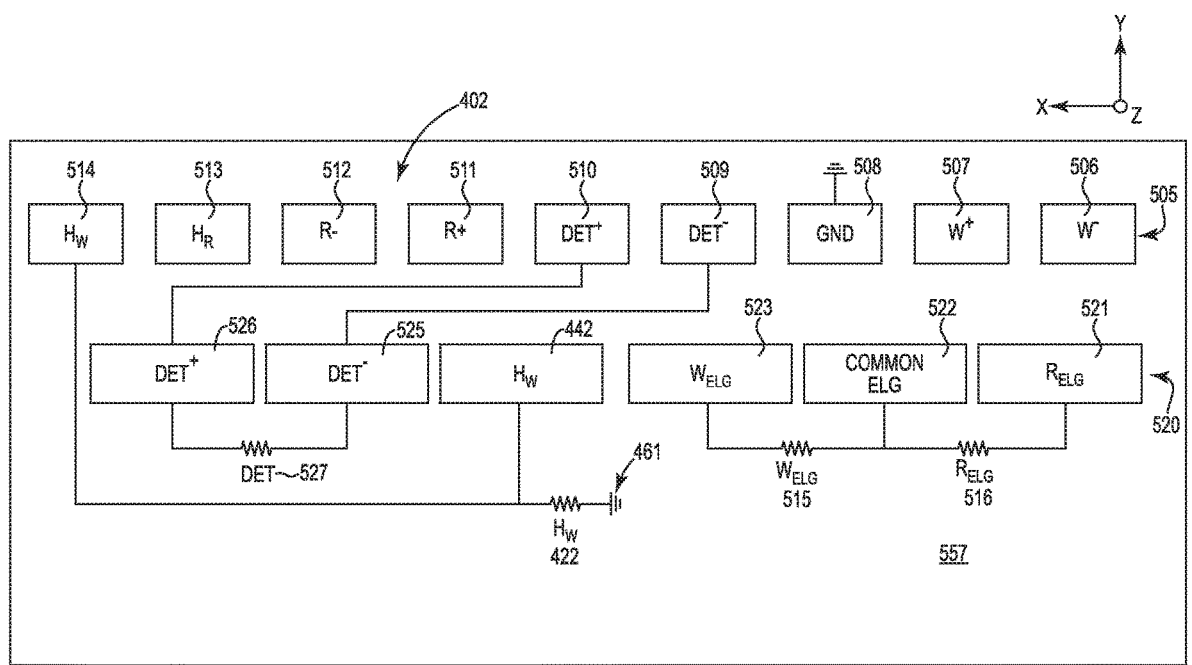
FIG. 5 is a schematic view of an example of an individual slider shown in FIG. 4 and other contact pads for other slider devices.

In more detail, for illustration purposes, a nonlimiting example according to the present disclosure is described with respect to FIGS. 4 and 5 where a first transducer device is a electromagnetic writer device (writer) and a second transducer device is a magnetoresistive reader device (reader). The sliders in FIG. 4 represent a sliders that have been through rough lapping.

A nonlimiting example of a system for providing electrical power to a plurality of heat sources in a row bar during lapping is described herein below with respect to FIG. 4. FIG. 4 shows a portion of a row bar 400 having a plurality of sliders, and schematically represents an electrical interconnect configuration (note: the contact pads are shown diagrammatically, not how they are physically located and positioned). Sliders 401-406 are shown and each slider 401-406 includes an electrically conductive portion adjacent to an electrically insulating portion. Each electrically insulating portion of sliders 402-405 includes a transducer region. Each transducer region includes at least a heater device. Each slider 402-405 also includes a contact pad, where the heater device is electrically connected to the contact pad and the electrically conductive portion.

An electrical insulating portion of a slider that contains the transducer region can be made out of a wide variety of materials such as one or more electrically insulating metal-oxide materials. Nonlimiting examples of electrical insulating metal-oxide materials include alumina, silica, and combinations thereof.

An electrically conductive portion of a slider according to the present disclosure can be made out of a wide variety of materials. A nonlimiting example of such a material includes alumina and titanium-carbide composite material ("AlTiC"), gold, copper, and the like.

The transducer region of a slider can include a wide variety of electronic devices related to the read and write operations of a hard disc drive. As mentioned, the transducer region includes at least one device that can generate heat to expand one or more devices (e.g., reader and writer) during lapping. A nonlimiting example a device located in a transducer region that can generate heat includes an electrical resistive heater.

Transducer devices such as electrical resistive heaters can be electrically coupled to one or more electrically conductive contact pads that are also located on a slider. Contact pads provide electrical communication between an electrical device in the transducer region and an external power source. Electrical contact pads can be made out a variety of conductive materials such as gold and the like. Electrical devices such as an electrical resistive heater can be electrically connected to a contact pad via bonding, soldering, or other electrical connection (e.g., pogo pins or probe pins). For example, gold or aluminum wire can be used to electrically connect a contact pad to an electrical resistive heater.

In more detail, slider 402 includes an electrically conductive portion 451 adjacent to an electrically insulating portion 452. Electrically insulating portion 452 includes a transducer region 472. Transducer region 472 includes at least a heater device 422. Slider 402 also includes a contact pad 442. The heater device 422 is electrically connected to the contact pad 442 and the electrically conductive portion 451 via wire connections. Contact pad 442 is electrically connected to power supply 440 via electrical connection 432 and is "positively" biased so that current flows from power supply 440 to heater 422 via contact pad 442 at a predetermined current level. Current flows from heater 422 to electrically conductive portion 451 via a wire connection.

Slider 403 includes an electrically conductive portion 451 adjacent to an electrically insulating portion 452. Electrically insulating portion 452 includes a transducer region 473. Transducer region 473 includes at least a heater device 423. Slider 403 also includes a contact pad 443. The heater device 423 is electrically connected to the contact pad 443 and the electrically conductive portion 451 via wire connections. Contact pad 443 is electrically connected to power supply 440 via electrical connection 433 and is "negatively" biased so that current flows to power supply 440 from heater 422 via contact pad 442 at a predetermined current level. Current flows to heater 423 from electrically conductive portion 451 via a wire connection.

Slider 404 includes an electrically conductive portion 451 adjacent to an electrically insulating portion 452. Electrically insulating portion 452 includes a transducer region 476. Transducer region 476 includes at least a heater device 426. Slider 404 also includes a contact pad 446. The heater device 426 is electrically connected to the contact pad 446 and the electrically conductive portion 451 via wire connections. Contact pad 446 is electrically connected to power supply 440 via electrical connection 436 and is "positively" biased so that current flows from power supply 440 to heater 426 via contact pad 446 at a predetermined current level. Current flows from heater 426 to electrically conductive portion 451 via a wire connection.

Slider 405 includes an electrically conductive portion 451 adjacent to an electrically insulating portion 452. Electrically insulating portion 452 includes a transducer region 477. Transducer region 477 includes at least a heater device 427. Slider 405 also includes a contact pad 447. The heater device 427 is electrically connected to the contact pad 447 and the electrically conductive portion 451 via wire connections. Contact pad 447 is electrically connected to power supply 440 via electrical connection 437 and is "negatively" biased so that current flows to power supply 440 from heater 427 via contact pad 447 at a predetermined current level. Current flows to heater 427 from electrically conductive portion 451 via a wire connection.

As can be seen in FIG. 4, each of the heater devices 422, 423, 426, and 427 use one contact pad to connect to the power supply 440. This can be highly advantageous because allocating space for contact pads in a slider can be challenging. This is explained further by referring to FIG. 5 and slider 402 shown in FIG. 4.

In order to electronically access slider devices (e.g., electromagnetic writer device, etc.) in addition to electrical resistive heater 422, a slider can include a plurality of electrical contact pads that may be electrically connected to the slider devices. FIG. 5 is a schematic that shows the trailing edge face 557 of slider 402. The contact pads illustrated are physically present on the trailing edge face 557. FIG. 5 also includes an electrical wiring diagram showing how the contact pads are electrically connected to devices such as ELGs, writer heater, DETCR, and the like. As shown in FIG. 5, slider 402 includes a first row 505 of electrical contact pads along the cross track axis "x" and a second row 520 of electrical contact pads along the cross track axis "x". The first row 505 of contact pads include a ground contact pad 508, which can be electrically connected to one or more devices used during head-gimbal assembly (HGA) operation in a hard disk drive (HDD). The second row 520 of electrical contact pads can be dedicated for use of devices used during lapping according to the present disclosure. That way, electrical connections can be made to the second row 520 of electrical contact pads and then after lapping is done, the second row 520 of electrical contact pads can just be left unused, thereby leaving the first row 505 of electrical contact pads in relatively good condition. For example, the first row 505 of electrical contact pads can avoid having undue scratching or any remnants of wire bonds from the lapping process.

In more detail, with reference to the slider 402 illustrated in FIG. 5, electrical contact pads 506 and 507 can be electrically connected to an electromagnetic writer device and electrical contact pads 511 and 512 can be electrically connected to a magnetoresistive reader device. A reader electrical resistive heater can be electrically connected to electrical contact pad 513.

With respect to the slider 402, devices in addition to writer heater 422 that can be used during lapping include writer electronic lapping guide (ELG) 515 and reader ELG 516. As shown, writer ELG is electrically connected to electrical contact pads 522 and 523 and reader ELG 516 is electrically connected to electrical contact pads 521 and 522. Such an electrical connection configuration permits writer ELG 515 and reader ELG 516 can share a common electrical contact pad 522 to save space in the second row 520 of electrical contact pads. Also, as shown, ELG 515 and ELG 516 are isolated from ground (e.g., ground 508), which can mitigate interference and facilitate precise measurement with ELG 515 and ELG 516.

Also, thermal sensor 527 (e.g., DETCR) can be electrically connected to electrical contact pads 525 and 526 in the second row 520, which, as shown, can be electrically connected to electrical contact pads 509 and 510, respectively, in the first row 505. Alternatively, each pair of contact pads 525 and 526, and 509 and 510, respectively, could electrically connect to independent devices (e.g., sensor 527 and a different device) and do not need to share connections as shown.

Finally, writer electrical resistive heater 422 can be electrically connected to electrical contact pad 442 in the second row 520 and electrical contact pad 514 in the first row 505. This way, electrical connections can be made to electrical contact pads in the second row 520 for lapping purposes, thereby avoiding undue scratching and/or remnants of wire bonds on electrical contact pads in the first row 505. During disk drive operation, writer electrical resistive heater 422 can receive electrical power via contact pad 514. As can be seen, using one contact pad 442 for writer heater 422 during lapping saves space in second row 520. For example, although not drawn to exact scale, contact pads in the first row 505 can have a relatively shorter width in the "x" direction as compared to contact pads in the second row 520. For illustration purposes only, in some embodiments the nine contact pads in the first row 505 can have a width of approximately one-half in the "x" direction as compared to the six contact pads in the second row 520. The width of the contact pads in the second row 520 is relatively larger than the contact pads in the first row 505 to, e.g., accommodate wirebond interconnects.

Alternatively, each of contact pads 442 and 514 could electrically connect to independent devices and do not need to share a connection as shown. For example, as mentioned above, instead of using a writer electrical resisistive heating device or reader electrical resisistive heating device, one or more optional electrical resisistive heating devices could include and used only during lapping. In such an embodiment, an optional electrical resisistive heating device could be electrically coupled to ground 461 and only one contact pad (e.g., contact pad 442) in the second row 520 while not being electrically connected to a contact pad in the first row 505.

To complete the electrical circuit for writer electrical resistive heater 422 while using one contact pad 442, writer electrical resistive heater 422 is in electrical communication with a ground. As shown in FIGS. 4 and 5 writer electrical resistive heater 422 is in electrical communication with power supply ground 461.

In more detail, as shown in FIG. 4, writer electrical resistive heater 422 is electrically connected to electrically conductive portion 451 via a wire connection. All of the electrically conductive portions 451 for all of the sliders in row bar 400 are in electrical communication with each other. Alternatively, a layer (not shown) of electrically conductive material could be located on the row bar 400 to electrically connect all of the heaters used during lapping to a ground.

As shown in FIG. 4, the heater devices 422, 423, 426, and 427 electrically connect to ground 461 via end, "dummy" sliders 401 and 406. As can be seen, sliders 401 and 406 are located on the ends of row bar 400 and can be considered sacrificial in that they are merely used for a variety of reasons related to slider manufacture but are not ultimately formed into sliders for use in a hard disk drive. According to the present disclosure, they can also be used for electrically connecting the heaters used during lapping to the electrical ground 461 of power source 440. Like slider 402, slider 401 includes an electrically conductive portion 451 adjacent to an electrically insulating portion 452. But, unlike slider 402, slider 401 does not include a transducer region, any related transducer devices (e.g., a heater device), or any contact pads. The electrically conductive portion 451 of slider 401 (and the entire row bar 400) is in electrical communication with ground 461 via a wire connection to make a complete circuit. Similar to dummy slider 401, dummy slider 406 includes an electrically conductive portion 451 adjacent to an electrically insulating portion 452. Slider 406 does not include a transducer region, any related transducer devices (e.g., a heater device), or any contact pads. The electrically conductive portion 451 of slider 406 (and the entire row bar 400) is in electrical communication with ground 461 via a wire connection to make a complete circuit.

In addition to electrically connecting the heaters of row bar 400 to ground 461 during lapping, any net current that may be present in row bar 400 can return to ground 461 through dummy sliders 401 and/or 406 instead of any of the sliders being manufactured (e.g., 402-405), thereby protecting said sliders from any undue amounts of current. Alternatively, or additionally, one or more sliders, other than dummy sliders 401 and 406, that may have become unusable as a slider in a hard disk drive may be used like sliders 401 and 406 to connect the electrically conductive portions 451 of row bar 400 to ground 461.

It is noted that an electrically conductive lapping plate such as lapping plate 320 could function as an electric ground when the electrically conductive portions 451 of row bar 400 are in contact with lapping plate 320 during lapping.

While row bar 400 is being lapped, controller 480 can instruct the power source 440 to provide a pre-determined current with a pre-determined "bias" (direction of current flow) to each slider in row bar 400 that is in electrical communication with electrical power source 440. The current bias can be selected for each slider in the row bar 400 to provide a desired net-current (sum of all currents) that is less as compared to if the same bias was applied to all sliders in row bar 400. Reducing the net-current can help prevent exceeding a maximum "break-down" current of one or more electrical channels.

In some embodiments, the bias of each slider in a row bar can be selected so that the net current flowing through a row bar is the sum of each negative-bias current and each positive-bias current applied to the heater devices and is 250 milliamps or less, or even 200 milliamps or less. In some embodiments, the net current may be from 20 to 175 milliamps.

The electrical bias that is designated for any given slider can be selected as desired. In some embodiments, as shown in FIG. 4, the electrical bias can alternate ("alternating bias") from one slider to another. In some embodiments, depending on the total number of sliders, such a configuration can result in 50 percent of sliders having a positive bias and 50 percent of the sliders having a negative bias. Alternatively, one or more other electrical bias configurations could be selected. For example, the electrical bias could alternate from positive to negative, and vice versa, after a selected number (block) of sliders (e.g., every two, three, four, five, etc. sliders).

What is claimed is:

1. A method of lapping a row bar having a plurality of sliders, wherein the method comprises:
   a) providing the row bar, wherein the row bar comprises:
      i) at least a first slider comprising:
         A) a first contact pad;
         B) a transducer region, wherein the transducer region comprises at least a first heater device;
         C) an electrically insulating portion that comprises the transducer region; and
         D) an electrically conductive portion adjacent to the electrically insulating portion, wherein the first heater device is electrically connected to the first contact pad and the electrically conductive portion; and
      ii) at least a second slider comprising:
         A) a second contact pad;
         B) a transducer region, wherein the transducer region comprises at least a second heater device;
         C) an electrically insulating portion that comprises the transducer region; and
         D) an electrically conductive portion adjacent to the electrically insulating portion, wherein the second heater device is electrically connected to the second contact pad and the electrically conductive portion;
   b) applying current from a power source to the row bar, wherein a positive-bias current is applied to the first heater device to generate heat and a negative-bias current is applied to the second heater device to generate heat;
   c) lapping the row bar while applying the positive-bias current and the negative-bias current.

2. The method of claim 1, wherein the row bar further comprises one or more additional sliders, wherein each additional slider comprises:
   A) a contact pad;
   B) a transducer region, wherein the transducer region comprises at least one heater device;
   C) an electrically insulating portion that comprises the transducer region; and
   D) an electrically conductive portion adjacent to the electrically insulating portion, wherein the at least one heater device is electrically connected to the contact pad and the electrically conductive portion,
wherein applying current from the power source to the row bar further comprises applying a positive-bias current or a negative-bias current to the at least one heater device in each additional slider.

3. The method of claim 2, wherein the current alternates between positive-bias current and negative-bias current for each adjacent slider.

4. The method of claim 2, wherein the one or more additional sliders is at least two additional sliders, and wherein a positive-bias current is applied to fifty percent of the heater devices in the row bar and a negative-bias current is applied to fifty percent of the heater devices in the row bar.

5. The method of claim 1, wherein the row bar further comprises one or more additional sliders, wherein each additional slider comprises:
   A) a contact pad;
   B) a transducer region, wherein the transducer region comprises at least one heater device;
   C) an electrically insulating portion that comprises the transducer region; and
   D) an electrically conductive portion adjacent to the electrically insulating portion, wherein the at least one heater device is electrically connected to the contact pad and the electrically conductive portion,
wherein applying current from the power source to the row bar further comprises applying a positive-bias current or a negative-bias current to the at least one heater device in each additional slider, wherein a net current is the sum of each negative-bias current and each positive-bias current applied to the heater devices, wherein the net current is 250 milliamps or less.

6. The method of claim 1, wherein the row bar further comprises at least one additional slider, wherein the at least one additional slider is electrically connected to ground.

7. The method of claim 1, wherein the row bar further comprises at least two additional sliders, wherein the at least two additional sliders are each electrically connected to ground.

8. The method of claim 7, wherein each of the at least two additional sliders do not include a heater device.

9. The method of claim 1, wherein the electrically insulating portion is made of material comprising one or more electrically insulating metal-oxide materials.

10. The method of claim 9, wherein the one or more electrical insulating metal-oxide materials are chosen from alumina, silica, and combinations thereof.

11. The method of claim 1, wherein the electrically conductive portion is made of material comprising an alumina and titanium-carbide composite material.

12. The method of claim 1, wherein the electrically conductive portion comprises a layer of electrically conductive material that is electrically connected to the first and the second heater devices.

13. A lapping system comprising:
   a) a mounting structure that can removably couple a row bar, wherein the row bar comprises:
      i) at least a first slider comprising:
         A) a first contact pad;
         B) a transducer region, wherein the transducer region comprises at least a first heater device;
         C) an electrically insulating portion that comprises the transducer region; and
         D) an electrically conductive portion adjacent to the electrically insulating portion, wherein the first heater device is electrically connected to the first contact pad and the electrically conductive portion; and
      ii) at least a second slider comprising:
         A) a second contact pad;
         B) a transducer region, wherein the transducer region comprises at least a second heater device;
         C) an electrically insulating portion that comprises the transducer region; and
         D) an electrically conductive portion adjacent to the electrically insulating portion, wherein the second heater device is electrically connected to the second contact pad and the electrically conductive portion;
   b) a lapping plate having a lapping surface that is operable to rotate and contact the row bar to remove material from the row bar while the lapping plate rotates and contacts the row bar;
   c) a power source electrically coupled the first and second contact pads; and
   d) a controller electrically coupled to the power source, wherein the controller comprises program instructions comprising:
      i) applying current from the power source to the first and second heater devices, wherein a positive-bias current is applied to the first heater device to generate heat and a negative-bias current is applied to the second heater device to generate heat; and ii) lapping the row bar while applying the positive-bias current and the negative-bias current.

14. The lapping system of claim 13, wherein the row bar further comprises one or more additional sliders, wherein each additional slider comprises:
    A) a contact pad;
    B) a transducer region, wherein the transducer region comprises at least one heater device;
    C) an electrically insulating portion that comprises the transducer region; and
    D) an electrically conductive portion adjacent to the electrically insulating portion, wherein the at least one heater device is electrically connected to the contact pad and the electrically conductive portion,
wherein the power source is electrically coupled each contact pad of each additional slider, and wherein the program instructions comprise:
    i) applying current from the power source to each heater device in each additional slider, wherein a positive-bias current or negative-bias current is applied to each heater device in each additional slider to generate heat; and
    ii) lapping the row bar while applying the positive-bias current or the negative-bias current.

15. The lapping system of claim 14, wherein the power source is adapted to alternate current provided to each adjacent slider from positive-bias current to negative-bias current.

16. The lapping system of claim 14, wherein the power source is adapted to apply positive-bias current to fifty percent of the heater devices in the row bar and a negative-bias current to fifty percent of the heater devices in the row bar.

17. The lapping system of claim 13, wherein the row bar further comprises one or more additional sliders,
    wherein each additional slider comprises:
    A) a contact pad;
    B) a transducer region, wherein the transducer region comprises at least one heater device;
    C) an electrically insulating portion that comprises the transducer region; and
    D) an electrically conductive portion adjacent to the electrically insulating portion, wherein the at least one heater device is electrically connected to the contact pad and the electrically conductive portion,
    wherein the power source is electrically coupled each contact pad of each additional slider, and wherein the program instructions comprise:
        i) applying current from the power source to each heater device in each additional slider, wherein a positive-bias current or negative-bias current is applied to each heater device in each additional slider to generate heat, wherein a net current is the sum of each negative-bias current and each positive-bias current applied to the heater devices, wherein the net current is 250 milliamps or less; and
        ii) lapping the row bar while applying the positive-bias current or the negative-bias current.

18. The lapping system of claim 13, wherein the row bar further comprises at least two additional sliders, wherein the at least two additional sliders are each electrically connected to ground.

19. The lapping system of claim 18, wherein each of the at least two additional sliders do not include a heater device.

20. The lapping system of claim 13, wherein the electrically conductive portion comprises a layer of electrically conductive material that is electrically connected to the first and the second heater devices.

* * * * *